Patented Sept. 8, 1931

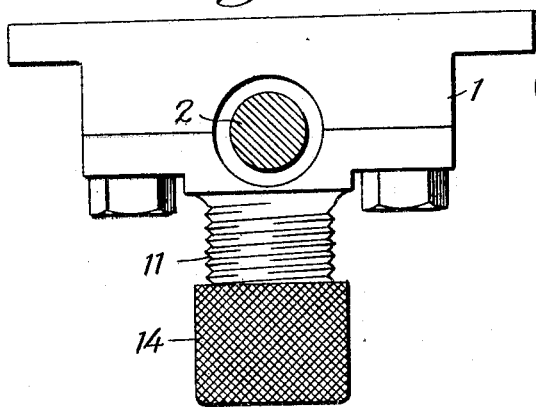
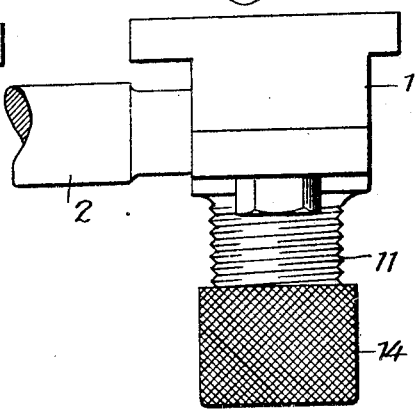
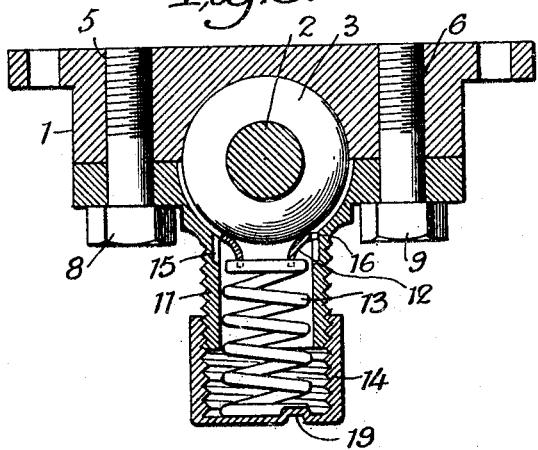
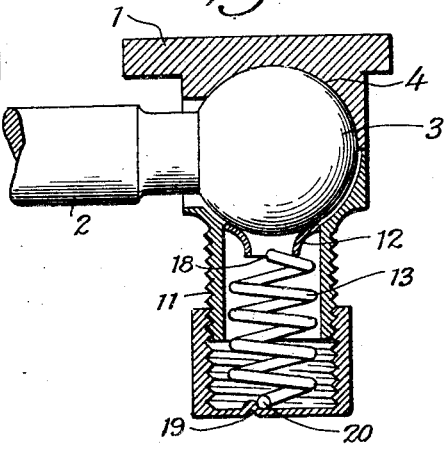
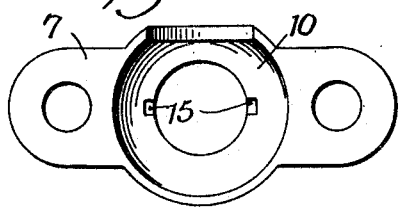
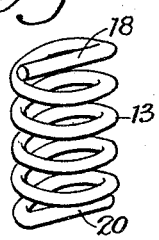
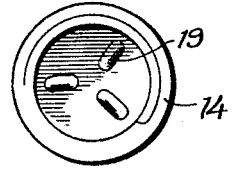
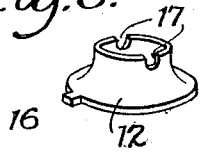

1,822,479

UNITED STATES PATENT OFFICE

LEO EDELMANN, OF CHICAGO, ILLINOIS, ASSIGNOR TO E. EDELMANN & CO., OF CHICAGO, ILLINOIS, A CORPORATION OF ILLINOIS

BEARING ANTIRATTLER

Application filed March 15, 1928. Serial No. 261,850.

My present invention relates to bearing anti-rattlers, and particularly to an anti-rattler intended and adapted for use upon ball and socket bearings such as are employed at the ends of radius rods, upon steering rods and knuckles, and in other like connections upon automobiles and other machinery.

An object of my invention is to provide an anti-rattler structure which can be fitted for use upon bearings already installed, and which includes lubricating means with the anti-rattler.

A further object resides in so constructing the parts that adjustments of the lubricating and anti-rattler structure can be made to suit the requirements of use.

Another object is to provide a structure with which the adjustable parts will be held in adjusted positions without the use of cotterpins or other extraneous fastenings.

With the above and other objects in view, my present invention includes certain novel features of construction and combinations of parts which will be hereinafter set forth in connection with the drawings and then particularly pointed out in the claims.

In the drawings:

Figure 1 is a view in elevation of a bearing having my improved anti-rattler structure applied.

Fig. 2 is a view in side elevation.

Fig. 3 is a longitudinal vertical sectional view.

Fig. 4 is a vertical sectional view taken substantially at right angles to the disclosure in Fig. 3.

Fig. 5 is a detail view to better show one of the bearing members.

Fig. 6 is a perspective view of the anti-rattler spring.

Fig. 7 is a detail view of the lubricant cap or cup.

Fig. 8 is a perspective view of the anti-rattler bearing member.

In the present instance I have shown my invention applied in conjunction with a bearing member 1 such as is used to mount the inner end of a radius rod of a Ford automobile, although it will be appreciated that this bearing member 1 can be considered as any other bearing member and that the radius rod 2 might be a portion of the steering gear, or any other member to be mounted with its ball end 3 associated with the bearing member 1. This bearing member 1 has a bearing opening 4 therein to receive the ball member 3 and openings are provided on each side at 5 and 6 to receive fastenings by which my improved anti-rattler bearing structure is secured in place.

A second bearing member 7 is adapted to be secured in conjunction with the first bearing member 1 by means of bolts 8 and 9 fitted in openings 5 and 6, or by any other suitable fastening means, and this second bearing member 7 has an opening 10 therein of sufficient size to clear the ball end 3 of the rod 2.

An externally screw-threaded sleeve 11 is provided upon the bearing member 7 to extend laterally substantially in line with the center of the bearing socket or opening 4, and this sleeve preferably has an internal diameter somewhat less than the diameter of the bearing ball 3.

An anti-rattler ball seat 12 which is in the form of a cup-shaped annular ring, best shown in Fig. 8, is adapted to fit loosely within the bore of sleeve 11 with its flared end against the bearing ball 2, and an anti-rattler spring 13 is held within the bore of sleeve 11 to resiliently urge this ball seat 12 against the bearing ball 3, pressure being exerted against the outer end of anti-rattler spring 13 by an internally threaded cap or cup 14 which is turned onto the external screw-threads of sleeve 11.

The sleeve 11 has spline grooves 15 formed along the wall adjacent the inner end thereof and the extension tongue or spline 16 on the ball seat 12 is adapted to fit in one of these grooves 15 to hold the ball seat against turning within the sleeve, the ball seat, however, being left free for sliding movement in line with the length of the sleeve.

On its outer side or edge the ball seat 12 is provided with grooves 17, and a cross bar 18 at one end of the spring 13 is adapted to fit in these grooves 17 so that spring 13 will be held against rotational movement within the bore of sleeve 11. The cap or cup 14 has ribs 19 struck or bossed inwardly on the head end thereof and these ribs are adapted to engage the end 20 of spring 13 which is made in the form of a cross bar corresponding substantially to the end 18.

In the use of my improved anti-rattler bearing structure the bearing member 7 is fitted in place to mate up with the bearing member 1, ball seat 12 having first been inserted within the bore of sleeve 11 from the inner end. The bore of sleeve 11 can then be filled with grease or other lubricant and spring 13 is fitted in place with the end 18 received in recesses 17. The central opening of this ball seat 12 permits free passage of the lubricant to the bearing ball 3, and cup or cap 14 can be filled with grease and then turned onto sleeve 11 to retain the lubricant within the sleeve. As the cap or cup is turned into place the end 20 of spring 13 will flex to pass over the ribs 19 and will reflex to seat back of these ribs to prevent casual turning of the cap or cup due to vibration and the like. As the cap or cup is tightened onto the sleeve to force lubricant to the bearing the spring will function to lock the same in any adjusted position.

While I have herein shown and described only certain specific embodiments of my invention and have suggested only certain possible adaptations and uses for the structure, it will be appreciated that changes and variations can be resorted to.

I claim:

1. With a bearing member adapted to receive a bearing ball and having a threaded sleeve extending therefrom laterally, a ball seat fitted within the sleeve, a spring bearing against said ball seat to hold the same against the bearing ball and secured against rotation within the sleeve, and a threaded cap turned onto said sleeve to urge the spring against the ball seat and provided with projections and said spring having a portion extending as a pawl to engage with said projections to hold the cap against casual turning.

2. A bearing anti-rattler comprising a bearing member adapted to receive a bearing ball, a secondary member mating with said first bearing member and provided with a threaded sleeve extending therefrom substantially in line with the center of the bearing ball, a ball seat fitted for sliding movement only within said sleeve, a spring fitted within the sleeve connected with said ball seat and held against rotation thereby, and a member fitting the threaded portion of said sleeve to bear against the outer end of said spring, said member being provided with projections and said spring having a portion extending as a pawl to engage with said projections to lock said member against casual turning.

3. A bearing anti-rattler comprising a bearing portion adapted to receive a bearing ball, a bearing member mating with said bearing portion and provided with a laterally extending externally screw threaded sleeve, said sleeve having a spline groove adjacent its inner end, a flared cup-shaped ball seat fitted slidably within said sleeve to engage the bearing ball and provided with an extension received in the spline groove to hold the washer against rotation, a pressure spring having its ends formed as transversely extending bars fitted in the bore of said sleeve against the ball seat and having one of the bars of the spring interlocking therewith whereby said spring is held against rotation, and a cap turned onto the threaded sleeve compressing the spring, said cap being provided with projections to engage the cross bar portion of the adjacent end of the spring to lock the cap against casual turning.

In testimony whereof I affix my signature.

LEO EDELMANN.